United States Patent Office 3,235,550
Patented Feb. 15, 1966

3,235,550
NOVEL 2-PHENYLAMINO-4H-5,6-DIHYDRO-1,3-THIAZINE DERIVATIVES
Otto Behner, Cologne-Stammheim, Hans Henecka, Wuppertal-Elberfeld, Friedrich Hoffmeister, Wuppertal-Vohwinkel, Horst Kreiskott, Wuppertal-Elberfeld, Werner Meiser, Wuppertal-Vohwinkel, and Hans Werner Schubert and Wolfgang Wirth, Wuppertal-Elberfeld, Germany, assignors to Farbenfabriken Bayer Aktiengesellschaft, Leverkusen, Germany, a corporation of Germany
No Drawing. Filed July 5, 1963, Ser. No. 293,189
Claims priority, application Germany, July 5, 1962, F 37,232
5 Claims. (Cl. 260—243)

This invention relates, in general, to organic chemistry, and involves the provision of novel derivatives of 2-phenylamino-4H-5,6-dihydro-1,3-thiazines. In particular, the invention is directed to the provision of certain compounds of the general class described which are found to possess unusual and outstanding pharmacodynamic activity. The invention additionally involves the provision of several alternate syntheses for the production of these compounds.

It has been known heretofore that one may obtain 2 - phenylamino - 4H - 5,6-dihydro-1,3-thiazines, unsubstituted or monosubstituted in the benzene ring, by reacting aryl isothiocyanates with 3-aminopropanol or trimethylene imine, and cyclisizing the resulting thioureas by heating in concentrated hydrochloric acid [M. Tisler, Arch. Pharm., 293, 621 (1960)]. It is further known that the reaction of γ-iodopropylamine with p-tolyl isothiocyanate yields 2 - p - tolylamino - 4H-5,6-dihydro-1,3-thiazine [M. Frankel, Ber., 30, 2497 (1897)]. These known compounds, however, possess little or no pharmacological activity. Thus, the 2-o-tolylamino-4H-5,6-dihydro-1,3-thiazine exhibits only a weak tranquilizing activity, for example.

The present invention is based, in part, on the discovery that compounds of the general class described which possess truly outstanding pharmacological activity are produced when:

(a) Poly-substituted phenyl isothiocyanates are added to 3-aminopropanol-(1) or trimethylene imine to yield the corresponding thioureas which are then treated with acids, or (b) Poly-substituted phenyl isothiocyanates are reacted with 3-halopropylamines, or (c) N-phenyl-thioureas, poly-substituted on the benzene ring, are reacted with 1,3-dihalopropanes or 3-halopropylamine salts, or (d) aromatic amines, poly-substituted on the benzene ring, are reacted with γ-halopropyl isothiocyanates or (e) Aromatic amines, poly-substituted on the benzene ring, are reacted with 2-amino-, 2-mercapto-, or 2-alkylmercapto-4H-5,6-dihydro-1,3-thiazines, optionally in the presence of acids.

Typical preferred substituent groups of the foregoing reaction components include lower alkyl, aryl, aralkyl and alkoxy, as well as halogen atoms, trihalomethyl, nitro, acyl, acylamino or hydroxyl groups.

The foregoing reactions utilized in the production of the unique compounds of the invention can be effected in aqueous, aqueous-alcoholic or alcoholic solution, as well as in aliphatic, or aromatic solvents, or in the melt, the particular choice of a suitable solvent or diluent merely being determined in established manner having reference to the stability and reactivity of the specific reaction components in each instance. In this connection, the use of solvents or diluents generally proves to be expedient, but is not absolutely necessary.

The compounds of the invention which, as pointed out hereinabove are unique in the fact that they possess a surprising variety of pharmacodynamic activities, are intended for administration as therapeutic agents in base form or in the form of their salts with non-toxic inorganic or organic acids. Thus, they exhibit an analgetic activity similar to that of morphine, which renders it possible to perform surgical operative treatments on warm-blooded animals, including even abdominal operations, without causing the classical symptoms of total anesthesia in the EEG. On the other hand, these derivatives exhibit a strong tranquilizing activity upon peroral administration. Additionally, certain of the novel compounds exhibit a remarkable coronary activity with respect to increasing the oxygen saturation in the coronary sinus venous blood on an anaesthesized dog, for example, following intravenous injection, and even at relatively low dosage levels, whereas, on the other hand, certain of the compounds of the invention are characterized by strong stimulant effects. These activities have been demonstrated in an extensive series of pharmacological studies conducted with a typical compound of the invention (Example I), which shall be described in detail hereinafter.

For present purposes, however, it is believed that the invention may be best understood by reference to the following specific examples illustrating the application of the foregoing principles and procedures in the production of typical compounds of the invention:

*Example I*

2,6-dimethylphenyl isothiocyanate, in amount of 31 grams (0.2 mole), prepared from 2,6-dimethylaniline with thiophosgene, were added dropwise during 15 minutes to a well-stirred suspension of 15 grams (0.2 mole) of 3-aminopropanol-(1) in 100 cubic centimeters of ether. The ether started to boil. Stirring under reflux was continued for 30 minutes, and the ether was then distilled off. The residue was treated with 100 cubic centimeters of concentrated hydrochloric acid and boiled under reflux for 30 minutes. After cooling, it was diluted with water, filtered free from impurities, and the base was precipitated by the addition of concentrated sodium hydroxide solution. When recrystallized from benzene-ligroin, the resulting compound 2-(2,6-dimethylphenylamino)-4H-5,6-dihydro-1,3-thiazine, melts at 140–142° C. The yield amounted to 90% of the theoretical.

*Analysis.*—$C_{12}H_{16}N_2S$ (220.3):

|  | C | H | N | S |
|---|---|---|---|---|
| Calculated | 65.41 | 7.32 | 12.72 | 14.55 |
| Found | 65.64 | 7.39 | 12.83 | 14.12 |

The same compound was obtained in a yield of 85% when 50 cubic centimeters of water were employed as the solvent in place of the ether.

With reference to the following structural formula, the compounds listed in tabulated form below were prepared from the corresponding isothiocyanates and aminopropanols by application of analogous techniques:

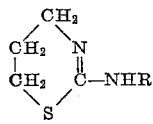

TABLE I

| R | Formula | Melting point, °C. |
|---|---|---|
| 3,4,5-trimethoxyphenyl- | $C_{13}H_{18}N_2O_3S$ | 121–123 |
| 2-methyl-5-chlorophenyl- | $C_{11}H_{13}ClN_2S$ | 164–165 |
| 2,6-diethylphenyl- | $C_{14}H_{20}N_2S$ | 111–115 |
|  | $C_{14}H_{20}N_2S \cdot HCl$ | 234–236 |
| 2,6-diisopropylphenyl- | $C_{16}H_{24}N_2S$ | 151–154 |
| 2,4,6-trimethylphenyl- | $C_{13}H_{18}N_2S$ | 122–125 |
| 2-ethyl-6-methylphenyl- | $C_{13}H_{18}N_2S$ | 85–88 |
| 2,4-dimethylphenyl- | $C_{12}H_{16}N_2S$ | 96–98 |
| 2,3-dichlorophenyl- | $C_{10}H_{10}Cl_2N_2S$ | 128–129 |
| 2,5-dichlorophenyl- | $C_{10}H_{10}Cl_2N_2S$ | 198–200 |
| 2,4,5-trichlorophenyl- | $C_{10}H_9Cl_3N_2S$ | 158–162 |
|  | $C_{10}H_9Cl_3N_2S$ | 214–215 |
| 2,4,6-trichlorophenyl- | $C_{10}H_9Cl_3N_2S$ | 169–171 |
| 2,3,4,5,6-pentachlorophenyl- | $C_{10}H_7Cl_5N_2S \cdot HCl$ | 255–258 |
| 2,6-diisopropyl-4-chlorophenyl- | $C_{16}H_{23}ClN_2S$ | 176–180 |
|  | $C_{16}H_{23}ClN_2S \cdot HCl$ | 225–227 |

Example II

γ-Bromopropylamine hydrobromide, in amount of 43.8 grams (0.2 mole), were dissolved in a little alcohol and treated in the cold with a solution of 0.2 mole of sodium ethoxide. The NaBr was filtered off, 35.5 grams (0.2 mole) of 2-ethyl-6-methylphenyl isothiocyanate were added to the filtrate, and it was boiled under reflux for 5 hours. After the alcohol had been distilled off, it was dissolved in water, the base was precipitated with sodium hydroxide solution, and it was recrystallized from benzene-ligroin. The compound, 2-(2-ethyl-6-methylphenylamino)-4H-5,6-dihydro-1,3-thiazine of melting point 85–88° C. was thus obtained in a yield of 62.5% of the theoretical.

Example III

A solution of 35.2 grams (0.26 mole) of 3-chloropropyl isothiocyanate (prepared from 3-chloropropylamine hydrichloride and thiophosgene in water-ethylene chloride at 20° C. in the presence of $CaCO_3$, boiling point 88–91° C./11 mm. Hg, yield 90%) and 32.4 grams (0.2 mole) of 2,6-dichloroaniline in 150 cubic centimeters of absolute xylene were stirred under reflux for 5 hours. The separated oil became crystalline on trituration. It was recrystallized from alcohol-ether and the hydrochloride of 2-(2,6-dichlorophenylamino)-4H-5,6-dihydro-1,3-thiazine was obtained in a yield of 41%. (The melting point is 236–239° C.)

Analysis.—$C_{10}H_{10}Cl_2N_2S \cdot HCl$ (297.7):

|  | C | H | Cl- | Cl | N | S |
|---|---|---|---|---|---|---|
| Calculated | 40.36 | 4.69 | 11.91 | 35.74 | 9.41 | 10.77 |
| Found | 40.71 | 3.89 | 11.98 | 35.19 | 9.09 | 11.05 |

With reference to the following structural formula, the compounds indicated in tabulated form below were obtained in an analogous manner:

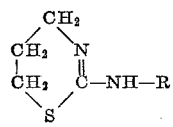

TABLE II

| R | Formula | M.P., °C. | Yield, percent |
|---|---|---|---|
| 2,6-diisopropylphenyl- | $C_{16}H_{24}N_2S \cdot HCl$ | 254–256 | 41 |
| 2-chloro-6-methylphenyl- | $C_{11}H_{13}ClN_2S \cdot HCl$ | 182–183 | 40 |

Example IV

Eighteen (18) grams (0.1 mole) of N-(2,6-dimethylphenyl)thiourea (prepared from 2,6-dimetyhlaniline and potassium thiocyanate) were heated to boiling with 150 grams of 1-chloro-3-bromopropane for 8 hours in a bath maintained at 160° C. Evolution of hydrogen halide, dissolution, and later crystallization, took place. After cooling, the crystals were filtered off with suction and washed with absolute ether. They were subsequently dissolved in water, and the base was precipitated with ammonium hydroxide. After recrystallization from benzene-ligroin, the desired compound, 2-(2,6-dimethylphenylamino)-4H-5,6-dihydro-1,3-thiazine, as described in Example I, was obtained (melting point 140–142° C.).

Example V

Eighteen (18) grams (0.1 mole) of N-(2,6-dimethylphenyl)-thiourea were thoroughly triturated wtih 13.4 grams of 3-chloropropylamine-(1) hydrochloride and melted together. The reaction set in at about 150° C. with a rise in temperature. It was maintained at 150° C. for another 15 minutes. The melt was boiled out twice with acetone for the removal of any possibly unchanged thiourea. The residue was dissolved in very dilute hydrochloric acid and filtered free from impurities. The base was then precipitated from the aqueous solution with sodium hydroxide solution, and was taken up with methylene chloride. When the methylene chloride solution had been dried and the solvent removed, 2-(2,6-dimethylphenylamino)-4H-5,6-dihydro-1,3-thiazine was distilled at about 180° C. and at a pressure of 0.1 mm. When recrystallized from benzene-ligroin, the compound melts at 140–142° C. It was found to be identical with the compound described in Example I.

Example VI

A mixture of 7.4 grams (0.05 mole) of 2-methylmercapto-4H-5,6-dihydro-1,3-thiazine and 7.9 grams (0.05 mole) of 2,4-dimethyl-aniline hydrochloride was heated in an oil bath. The evolution methyl mercaptan strated at about 90° C., and is vigorous at 115° C. It was stirred as soon as the mixture had become liquid. It was heated at 115–120° C. for 45 minutes, and then at 130–140° C. for 5 minutes longer. The resulting melt which is glass-like at room temperature was dissolved in water, and the base was precipitated with concentrated sodium hydroxide solution and recrystallized from ligroin. The resulting compound, 2-(2,4-dimethylphenylamino)-4H-5,6-dihydro-1,3-thiazine melts at 91–97° C. and is identical with the product prepared from 3-aminopropanol and 2,4-dimethylphenyl isothiocyanate. The yield was 4.7 grams which is equivalent to 43% of the theoretical.

In general, the compounds of the invention were deemed worthy of extensive pharmacological investigation by virtue of a distinct blood pressure-increasing and analgesic activity noted in preliminary experiments, whereas further pharmacological analysis revealed that certain of the compounds also exhibited considerable ataratic and intensified narcotic effects. Inasmuch as this spectrum of effects is in distinct contrast with known compounds of the same general class, the compound of Example I, namely, 2-(2,6-dimethylphenylamino)-4H-5,6-dihydro-1,3-thiazine, was selected for intensive pharmacological investigation since it evidenced particular polyvalency of effects. Thus, this compound is indicated, on a clinical basis, for psychiatric use in the treatment of psychotic conditions, in anaesthesiology for premedication, in internal medicine as a hypnoticum, analgesicum and tranquilizer.

Chemically, the compound of Example I is an almost tasteless, colorless, crystalline organic base, insoluble in water and alkalies, soluble in dilute acids, and in most organic solvents, including, for example, benzene, acetone, chloroform, etc., but only sparingly soluble in petroleum ether.

For experimental purposes and ease of identification, throughout the pharmacological investigations, the compound of Example I was designated by the code designation "Wh7286," and in the data presented hereinafter, the same designation will be employed. These data include the following categories, in the order indicated:

I. (1) Predominantly central effects:
    (a) Single administration
    (b) Reiterated dispensation
 (2) Ataractic properties
 (3) Action on fishes:
    (a) Effect on *Betta splendens*
    (b) Effect on guppy
 (4) Analgetic properties:
    (a) Analgesia test, on mice (tail)
    (b) Tooth test, on rabbits
    (c) Pressure test, on cats (tail)
    (d) Analgesia test on the inflamed cat paw
    (e) Joint test, on rats
 (5) Effect on polysynaptic reflexes:
    (a) Cats
    (b) Rabbits
 (6) Effect on body temperature:
    (a) With cats at the normal temperature
    (b) Antipyresis in guinea pigs
 (7) Effect on barbiturate narcosis:
    (a) Mice
    (b) Cats
 (8) Effect on respiration:
    (a) Rabbits
    (b) Dog
 (9) Anticonvulsive action in mice:
    (a) Electric shock
    (b) Metrasol cramp
    (c) Strychnine cramp
    (d) Nicotine cramp
(10) Antitussive action
(11) Antagonistic action against central-excitation compounds, in rats:
    (a) Tryptamine
    (b) Apomorphine
    (c) Methamphetamine
(12) Effect on EEG:
    (a) Spontaneous EEG
    (b) EEG—Arousal reaction
    (c) Antidote tests
        Nicotine
        Methamphetamine
        Lysergic acid diethylamide
        Physostigmine
        Tryptamine
        Levallorphan
(13) Surgical tests:
    (a) With cats
    (b) With dogs
    (c) With Rhesus monkeys II. Predominantly peripheral effects—
(14) Dropsy inhibition:
    (a) Yeast edema of the cat's paw
    (b) Formalin edema of the cat's paw
(15) Local anaesthesia:
    (a) Conductive anaesthesia
    (b) Surface anaesthesia
(16) Effect on smooth-muscle organs:
    (a) Isolated intestine
    (b) Sperm vesicle (rat)
    (c) Uterus (rabbit)
(17) Antihistamine effect
(18) Antiasthmatic effect
(19) Effect on intestinal mobility
(20) Diuresis
(21) Synaptic effects:
    (a) Myoneural transmission
    (b) Nicktitating membrane
(22) Effect on circulation:
    (a) Of wide-awake dogs and cats
    (b) Of narcotized cats
    (c) In "spinal" cats
    (d) Peripheral vascular ducts
        ($\alpha$) Frog
        ($\beta$) Guinea pig
        ($\gamma$) Rabbit ear
        ($\delta$) Dog
(23) Cardiac effects:
    (a) Guinea pig heart, according to Langendorff
    (b) $O_2$ content of venous blood
    (c) Effect on the EKG
(24) Effects on blood gases
III. Tolerance—
(25) Toxicity with a single dose
(26) Toxicity with reiterated doses
(27) Local tolerance
(28) Further personal tests
IV. Summation and Recapitulation Pharmacology I. Predominantly central effects (1) *Observations of the behavior of various animal species*:

(a) *Single dose (Table I)*.—Wh7286 has distinct sedative properties, which, with an increased dosage, change over into narcosis-like states with strong analgesia.

(b) *Repeated doses*.—3 mg./kg. of Wh7286 was administered intravenously to 2 cats on each of 5 successive work days. The typical reactions, viz. interference with the coordination, analgesia, and side turn, did not change essentially in the course of the test, although the duration of the effects appeared to become slightly shorter from day to day. Both animals lost weight.

On 12 days 5 mg./kg. of Wh7286 was administered subcutaneously each day to a monkey. At the start, intensely distinct coordination interferences, which after 5 days became slighter. (At the end of the treatment the total duration of the effects appeared to have become shorter.) The analgetic effect, fatigue, and greatly restricted mobility appeared, however, to be unchanged up to the end of the treatment. In spite of a strong attenuation of the appetite there was some food intake.

TABLE 1.—PRESENTATION OF THE ACTION OF Wh7286

| Animal | Mode of administration | Dose, mg./kg. | Number of animals | Comportment |
|---|---|---|---|---|
| Ferret | Subcutaneous | 1.0 | 2 | Slackening of the movements, coordination maintained. |
| | Do | 2.5 | 2 | Tottering gait, animals are motionless. |
| | Do | 5.0 | 3 | Stuporous, narcotic-like condition, reaction to painful irritation greatly attenuated. |
| | Do | 10.0 | 1 | Do. |
| | Do | 20.0 | 1 | Do. |

TABLE 1—Continued

| Animal | Mode of administration | Dose, mg./kg. | Number animals of | Comportment |
|---|---|---|---|---|
| Rabbit | Intravenous | 3.0–10.0 | 3 | Flabby, belly and side positions well endured, reacted to a pain-inducing irritation. |
|  | Do | 10.0–20.0 | 3 | Occasional cramps, otherwise as above. From 16 mg. onward, died. |
|  | Subcutaneous | 5.0–20.0 | 2 | Flabby, belly and side positions; reacted to painful irritation. |
| Cat | Intravenous | 0.5–5.0 | 5 | Apathy, tottering gait, belly and side positions; greatly relaxed. Shortly after the injection, occasional twitching of the front extremities, salivation and vomiting. |
|  | Do | 10.0–30.0 | 6 | Short cramps, 5 minutes after the injection like above. With 30 mg., death. |
| Dog | Intravenous | 0.5–2.5 | 3 | Unsteady gait, slowing-down. Strong relaxation, partly side position. None or weak reaction to a pain-inducing irritation. Effects increase with the dosage. Occasional twitching of the front extremities. Salivation and vomiting. |
|  | Do | 5.0 | 2 | As above; one animal developed cramps for a short time. |
|  | Do | 10.0 | 1 | Shivering cramps, aggressive during about 5 minutes, then like above. |
|  | Intramuscular | 5.0–15.0 | 5 | Atactic, side position, no reaction to pain-inducing irritations. Effect increased with the dosage. |
|  | Do | 20.0 | 1 | Intermittent cramp attacks; otherwise as above. |
|  | Peroral | 50.0–150.0 | 5 | Tired to atactic till side position. Results widely variable and not always reliably dependent on the dosage. |
|  | Do | 200.0 | 1 | Side position, later intermittent cramp (spasm) attacks, next morning dead. |
| Rhesus monkey | Subcutaneous | 0.5 | 1 | Ptosis (drooping of the upper eyelid), sluggish movements, fatigue, limp extremities. |
|  | Do | 1.0 | 2 | Ptosis, sluggish movements, great fatigue, muscular relaxation. |
|  | Do | 2.5 | 1 | About as with 0.5 and 1.0 mg./kg. |
|  | Do | 5.0 | 5 | Ptosis, heat drooping, great fatigue, languid, pallor. |
|  |  | 1–50 | 9 | O.W. (without effect). |
| Frog (Temporarien and Esculenten). | Into the lymph pouch. | 100.0 | 5 | After ½ hour, sluggish for 4 hours. Rear position not tolerated. |
|  |  | 200.0 | 3 | After ½ hour, rear position tolerated; 1 animal died, 2 survived. |

(2) *Ataractic properties as developed in the hamster (Table 2).*—[Literature: Kreiskott and Vater, Arch. f. exper. Path. u. Pharmakol. 1959, vol. 236, p. 100.]

As an emotional reaction in mammals the "fright" position assumed by the hamster was relied upon. Hamsters counteract against unfamiliar or dominant related mates, adversaries, or in the case of a fright, with a typical defense reaction. They throw themselves on their back, spread their extremities apart, and frequently utter a cry. Tranquilizing drugs affect the intensity of this reaction.

TABLE II

[Inhibition of the defense reaction in a "gold" hamster, mg./kg. p.o. De 70*]

Wh7286 ------------------------------------ 20
Methaminodiazepoxide -------------------- 10
Chloropromazine ------------------------- 30

*By "De70" is meant that dose in mg./kg., by which the typical reaction is suppressed in 70% of the animals started with.

*Result.*—Strong effect.

(3) *Effect on fishes.*—(a) Effect on aggression in the Siamese "fighting" fish (*Beta splendens*).

[Literature: Abramson and Crans, Science 1954, vol. 120, p. 990.]

(b) Effect on the color adaptation in the "guppy" (*Lebistes reticulatus*).

[Literature: Furst and Cutting, Neuropsychopharmacologia, 1959, p. 308.]

In the comportment test with the frog a slight sensitiveness towards Wh7286 was surprising (see Table 1). That this is also the case with cold-blooded animals was shown by the tests with fishes. A complete inhibition of the aggressiveness of the fighting fish occurred only with 100 mg./l.; inhibition of the color adaptation of the guppy after 50 mg./l. In a "fighting" fish Wh7286 has only $\frac{1}{25}$, in the guppy $\frac{1}{10}$–$\frac{1}{5}$ of the effect of chloropromazine. Methaniodiazepoxide is in a "fighting" fish twice as effective as Wh7286.

(4) *Analgesic properties*:

(a) Analgesia test with mice (*mouse-tail test*) Table 3.—[Literature: Wolff, Hardy and Goodell, Jour. Clin. Investigations, 1940, vol. 19, p. 659—Wirth, Arch. Exper. Path. u. Pharmakol., 1952, vol. 216, p. 77.]

In this test a focused heat ray (beam) is directed upon the animal's tail. As the analgesic effect, the prolongation of the reaction time (normally lasting 4 seconds) up to 12 seconds is evaluated. The retraction of the tail is considered to be the reaction to the pain. The De50 is that dose, at which 50% of the animals are analgetic (insensitive to pain) 20 animals for each does.

*Result.*—Medium effect.

(b) *Tooth test, applied to rabbits (Table 3).*—[Literature: Hertle, Schanne and Stafe, Arzneimittelforschung 1957, vol. 7, p. 311.]

In this case, the upper incisors of the animals are irritated by increasing amounts of current during 10 msec., 50 Hz. (measured in ma.) till the animals show a defensive reaction. The current strength which with an untreated animal eventuates in said defensive movements, is called "threshold value." The 100 Δ-value is that dose of the investigated compound which is needed for raising the threshold value 100% as against the initial position.

*Result.*—Strong effect.

(c) *Tail pressure test, applied to cats (Table 4).*—[Literature: Eddy, Jour. Pharm. Experim. Therapy 1932, vol. 55, p. 339.]

The tail tips of the animals are squeezed by means of a spring-pressure meter by which the pressure exerted is indicated in kg./sq. cm. Measure of the analgesic effect: The pressure (in kg./sq. cm.) increase tolerated under the action of the compound as against the initial value. Irritation reaction: Defensive movement of the animal, accompanied by vocal manifestations. The dose, with which a pressure increase of 5 kg./sq. cm. is just about tolerated, is For Wh7286 -------------------- About 1 mg./kg.
For morphine ------------------ About 2 mg./kg.
For thiopental ---------------- About 7 mg./kg.

*Result.*—Strong effect.

Since, in contrast with morphine, Wh7286 has a powerful, central-attenuating effect on cats, too, it appeared opportune to make a comparison with the analgesic properties of a narcotic. In order to preclude the real narcosis effects, the analgesia was tested at the time of the recovery of the upright-standing capacity of the animals. The reference compound used was thiopental (Table 5).

Result.—Wh>> thiopental.

TABLE 3.—ANALGESIA IN THE MOUSE AND RABBIT

| Compound | DL50 mouse, mg./kg., subcutaneous | DE50 mouse-tail test, mg./kg. | DL50/DE50 | DL50 rabbit intravenous mg./kg. | Rabbit tooth test, mg./kg., intravenous Δ100 | DL50/Δ100 |
|---|---|---|---|---|---|---|
| Wh7286 | 100 | ~7.0 | 14 | ~16 | ~0.35 | ~46 |
| Codein (base) | 115 | ~5.4 | 21 | ~28 | ~8.0 | ~3.5 |
| Pethidine (base) | 152 | ~13.0 | 12 | ~13 | ~2.0 | ~6.5 |
| Dextropropoxyphene | 110 | ~6.7 | 16 | ~7.5 | ~4.2 | ~1.8 |
| Phenoperidine | | ~0.55 | | ~1.5 | ~0.05 | ~30 |
| Morphine HCl | | ~2.2 | | >120 | ~1.2 | >100 |

TABLE 4.—ANALGESIA—CAT TAIL INTRAVENOUS INJECTION

| Compound | Dose, mg./kg. | Average value from animals | Initial portion, kg./sq.cm. | ΔP (kg./sq.cm.) at minutes after injection | | | | | | | |
|---|---|---|---|---|---|---|---|---|---|---|---|
| | | | | 1 | 3 | 5 | 15 | 30 | 45 | 60 | 75 |
| Wh7286, 0.1% | 0.5 | 4 | 4.9 | 3.1 | 2.0 | 0.7 | 0.3 | 0.5 | 0.5 | 0.5 | 0.2 |
| | 1.1 | 3 | 5.1 | 6.5 | 6.0 | 5.9 | 2.4 | 1.7 | 0.6 | 0.9 | 0.4 |
| | 1.5 | 1 | 3.0 | 7.5 | 7.5 | 7.5 | 4.0 | 3.5 | 4.0 | 3.5 | 3.5 |
| | 2.5 | 3 | 4.7 | 8.2 | 7.2 | 7.0 | 6.6 | 6.5 | 5.7 | 4.0 | 3.1 |
| | 4.5 | 1 | 9.2 | >10 | >10 | >10 | >10 | 9.0 | 9.0 | 5.8 | 4.8 |
| Morphine, 0.2% | 1.0 | 4 | 4.6 | 2 | 2.4 | 2.1 | 2.1 | 2.5 | 1.5 | 2.9 | 3.0 |
| | 2.0 | 3 | 4.3 | 1.4 | 1.5 | 2.0 | 4.5 | 3.4 | 5.4 | 5.9 | 2.2 |
| | 3.0 | 4 | 5.0 | >9.8 | >8.1 | >11.3 | >6.8 | >9.2 | 10.6 | 8.1 | 1.4 |
| Thiopental, 2% | 7.5 | 3 | 5.0 | 5.0 | 6.3 | 4.3 | | 9.1 | | | |
| | 10.0 | 3 | 4.5 | 8.3 | 5.6 | 5.7 | 0.5 | 1.5 | 0.1 | | |
| | 15.0 | 3 | 4.5 | >10.7 | >10.7 | >9.7 | >9.0 | >6.3 | 2.8 | 2.8 | 3.5 |
| | 20.0 | 1 | 5.5 | >13 | >13 | >13 | >13 | 7.5 | 3.0 | 1.5 | 1.0 |

| Compound | Dose, mg./kg. | Average value from animals | Initial portion, kg./sq. cm. | ΔP (kg./sq. cm.) at minutes after injection | | | | | | | |
|---|---|---|---|---|---|---|---|---|---|---|---|
| | | | | 90 | 105 | 120 | 135 | 150 | 165 | 180 | 195 | 210 |
| Wh7286, 0.1% | 0.5 | 4 | 4.9 | 0.1 | | | | | | | | |
| | 1.0 | 3 | 5.1 | 0.4 | | | | | | | | |
| | 1.5 | 1 | 3.0 | 1.0 | 2.0 | 1.5 | 1.0 | 1.0 | | | | |
| | 2.5 | 3 | 4.7 | 3.5 | 1.9 | 2.1 | 1.9 | 0.9 | 0.9 | 0.9 | 0.9 | |
| | 4.5 | 1 | 9.2 | 4.8 | 2.8 | 1.8 | 1.3 | 0.8 | | | | 0.9 |
| Morphine, 0.2% | 1.0 | 4 | 4.6 | 3.0 | 3.8 | 2.8 | | 3.7 | | 3.5 | | |
| | 2.0 | 3 | 4.3 | 2.5 | 3.4 | 4.5 | | 5.2 | | 6.5 | | 3.0 |
| | 3.0 | 4 | 5.0 | 6.7 | 8.0 | 8.5 | | 8.6 | | 9.0 | | 3.5 |
| Thiopental, 2% | 7.5 | 3 | 4.5 | | | | | | | | | |
| | 10.0 | 3 | 4.5 | | | | | | | | | |
| | 15.0 | 3 | 4.5 | 2.3 | 1.2 | 0.15 | | | | | | |
| | 20.0 | 1 | 5.5 | | | | | | | | | |

(d) *Analgesia test on the inflamed rat paw.*—[Literature: Randall and Selitte, Arch. of Inst. Pharm. 1947, vol. III, p. 409.]

10 and 20 mg./kg. of Wh7286, subcutaneous, were ineffective.

(e) *Rat joint test.*—[Literature: La Belle and Tislow, Jour. Pharmacol. and Experim. Therapy, 1960, vol. 98, p. 19.]

In this test, about 18 hours before the administration of the compound to be tested 0.2 ml. (cc.) of a 1%=silver nitrate solution was injected into the rear ankle-joint of rats. An acute arthritis sets in. On flexing the inflamed joint by the experimentator the animals scream with "pain." The absence of this reaction while the compound is acting, is evaluated, as the "analgesic" effect.

The DE50 of Wh7286 lies at 7 mg./kg. (subcutaneous).

Result.—Medium-high effect.

(5) *Effect on polysynaptic reflexes (central muscular relaxation).*—[Literature: Cardot, Laudier, Comptes-Rendus de la Societe de Biologie, 1922, vol. 86, p. 529.]

[Sherington, Journal of Physiology, 1917, vol. 51, p. 404. Slater and Leary, Journal of Pharmacology, 1950, vol. 100.]

(a) *Cats (Table 6).*—The influence on the polysynaptic, homolatereal reflex and on the linguomandibular reflex, as well as on the monosynaptic patellar reflex was investigated on intact animals under a gentle chloralose-urethan narcosis. The release took place every 5 seconds by an electrical irritation of the tongue's tip, and, respectively, of the Nervus tibialis. The patellar reflex was released (instigated) by an electromagnetically controlled hammer with a frequency of 1/sec. Every 3 nerve twitches were recorded partly by means of extensometer strips on a Schwarz EEG apparatus, partly by means of mechanically-actuated scribers (Kymographion.)

With a cat under a deep spinal anaesthesia Wh7286 had the same effect.

Result.—Strong effect.

(b) *Rabbits (Table 7).*—[Literature: Hoffmeister, Archiv fur experimentelle Pathalogie und Pharmakologie, 1961, vol. 241, p. 178.]

On wide-awake, intact rabbits the variations of the threshold values of the licking and jaw-opening reflex arising in response to a dental irritation was determined for the reflexes in response to linguomandibular and homolateral flexures under the action of the test compound. That dose in mg./kg. (intravenous), which leads to a 100%-increase of the threshold value beyond the initial position, is called the Δ100 value.

Result.—Strong effect.

(6) *Influence on the body temperature:*

(a) *Temperature drop in normothermal cats (Table 8).*—The action of the compound was tested with intravenous administration twenty hours prior to the start of the test and during the entire test the animals were held in a thermostable room at 22° C.

Result.—Distinct effect.

(b) *Antipyresis (Table 9).*—Wh7286 was investigated in doses of 0.1–5.0 mg./kg. with febrile guinea pigs.

Result.—Distinct effect.

(7) *Influence on barbiturate narcosis:*

(a) *Mouse.*—The hexabarbital narcosis of the mouse (100 mg./kg. of hexobarbital, subcutaneous) was detectably intensified by Wh7286; above 10 mg./kg. (s.c.) a deepening of the narcosis extending to 2 stages (according to Magnus-Arndt and a prolongation by 66 minutes were observed, and with more than 20 mg./kg. (s.c.) a deepening extending to 3 stages, i.e., prolongation by 75 minutes. The body temperature of the animals was lowered by 10 and 20 mg./kg. (s.c.) 2° and 3° C., respectively, as compared with the hexobarbital control test.

(b) *Cat (Table 10).*—A corresponding action of Wh7286 on the thiopental narcosis, too, was investigated.

*Results.*—For (a) and (b): strong effect.

(8) *Influence on respiration:*

(a) *Rabbits.*—The respiration volume of weak rabbits was investigated by the Scholz experimental method (spirometer respiration, semi-quantitative). In the latter instance the animals exhale through a mask into a gasometer. Control of the inhalation and exhalation is effected by Gildemeister valves.

5–10 mg./kg. of Wh7286 (intravenous) cause a slight slackening of the respiration rate which can be well counteracted by 5 mg./kg. of Metrazol (i.v.).

*Result.*—Slight inhibition.

TABLE 5.—ANALGESIA CAT TAIL

| Compound | Dose, mg./kg., intravenous | Number of animals | Instant of spontaneous walking, mins. after injection | Analgesia at this point, Δkg./cm.$^2$ | Average value, Δkg./cm.$^2$ |
|---|---|---|---|---|---|
| Wh7286 | 0.5 | 1 | At once | 5.0 | 2.9 |
|  |  | 2 | 3 | 0 |  |
|  |  | 3 | 3 | 3.3 | 2.9 |
|  | 1.0 | 1 | 30 | 2.7 |  |
|  |  | 2 | 22 | 2.0 |  |
|  |  | 3 | 85 | 0 | 1.6 |
|  | 1.5 | 1 | 60 | 3.5 | 3.5 |
|  | 2.5 | 1 | 45 | 4.3 |  |
|  |  | 2 | 60 | 6.5 | 4.8 |
|  |  | 3 | 60 | 3.5 |  |
|  | 3.0 | 1 | 30 | 4.3 | 4.3 |
|  | 3.5 | 1 | 100 | 8.0 |  |
|  |  | 2 | 80 | >13.0 | >9.3 |
|  |  | 3 | 150 | 6.8 |  |
|  | 5.0 | 1 | 80 | 5.0 |  |
|  |  | 2 | 90 | 13.5 | 8.6 |
|  |  | 3 | 180 | 7.3 |  |
| Thiopental | 7.5 | 1 | 22 | 0 |  |
|  |  | 2 | 22 | 0 | 0 |
|  |  | 3 | 10 | 0 |  |
|  | 10.0 | 1 | 25 | 0.5 |  |
|  |  | 2 | 10 | 0 | 0.7 |
|  |  | 3 | 17 | 1.5 |  |
|  | 15.0 | 1 | 15 | 0 |  |
|  |  | 2 | 47 | 7.0 |  |
|  |  | 3 | 65 | 1.5 |  |
|  |  | 4 | 60 | 0.3 | 1.5 |
|  |  | 5 | 45 | 0 |  |
|  |  | 6 | 42 | 0 |  |
|  | 20.0 | 1 | 45 | 3.0 |  |
|  |  | 2 | 60 | 0.3 |  |
|  |  | 3 | 45 | 0 | 0.8 |
|  |  | 4 | 42 | 0 |  |

TABLE 6.—REFLEXES OF CATS

| Compound | Dose, mg./kg., intravenous | Linguomandibular reflex | | Flexure reflex | | Patellar reflex | |
|---|---|---|---|---|---|---|---|
|  |  | No. of tests | Percent inhibition within 15 min. after the administration | No. of tests | Percent inhibition within 15 min. after the administration | No. of tests | Percent inhibition within 15 min. after the administration |
| Wh7286 | 0.1 | 1 | 11 | 1 | 20 | 1 | 8 |
|  | 0.2 | 5 | 78 | 4 | 48 | 3 | 29 |
|  | 0.5 | 3 | 94 | 3 | 72 | 2 | 41 |
| Chlorpromazin | 0.25 | 3 | 64 | 3 | 33 |  |  |
|  | 0.5 | 7 | 61 | 5 | 17 |  |  |
|  | 1.0 | 4 | 68 | 4 | 44 |  |  |
| Methaminodiazepoxide | 0.5 | 2 | 9 | 1 | 50 | 1 | 25 |
|  | 1.0 | 5 | 49 | 3 | 66 | 2 | 16 |
|  | 2.0 | 2 | 47 | 1 | 60 |  |  |
| Phenyramidol | 2.5 | 2 | 25 | 2 | 2-16 | 0 |  |
|  | 5.0 | 3 | 86-100 | 2 | 70-95 | 1 | 44 |
|  | 10.0 | 3 | 100 | 2 | 100 | 1 | 100 |
| Mephenesin | 5.0 | 2 | 10-30 | 1 | 39 | 0 |  |
|  | 10.0 | 2 | 35-65 | 1 | 43 | 0 |  |
|  | 25.0 | 1 | 70 | 0 |  |  |  |
| Carisoprodel | 5.0 | 1 | 40 | 0 |  |  |  |
|  | 8.0 | 1 | 80 | 0 |  | 0 |  |
|  | 10.0 | 2 | 55-80 | 2 | 0 | 0 |  |
|  | 15.0 | 4 | 40-100 | 2 | 40-100 | 0 |  |

TABLE 7.—REFLEXES OF RABBITS

| Compound | Δ100-value, mg./kg. (intravenous) | | | |
|---|---|---|---|---|
|  | Lick reflex | Jaw-opening reflex | Linguomandibular reflex | Flexure reflex |
| Wh7286 | 0.35 | 3.3 | 6.4 | 2.1 |
| Morphine | 1.2 | 4.4 | 10.0 | 8.6 |
| Mephenesin | 76 | 180 | 115 | 140 |
| Chlorpromazin | 0.56 | 1.15 | >10 | 1.1 |
| Methaminediazepoxide | 37 | >250 | >250 | ~100 |
| Phenyramidol | ~25 | ~35 | ~35 | 36 |

TABLE 8.—TEMPERATURE DROP—CATS

| Compound | Dose, mg./kg. | Mode of administration | No. of animals | Start (30 mins. prior to administration) | Hours after administration | | | | | | | | | |
|---|---|---|---|---|---|---|---|---|---|---|---|---|---|---|
| | | | | | 1 | 2 | 3 | 4 | 5 | 6 | 7 | 8 | 25 | 30 |
| | | | | °C. | °C. | °C. | °C. | °C. | °C. | °C. | °C. | °C. | °C. | °C. |
| Wh7286 | 5 | s.c. | 1 | 38.1 | 36.6 | 36.3 | 35.7 | 34.4 | | | | | | |
| | | | 2 | 38.2 | 37.7 | 37.3 | 36.5 | 36.8 | | | | | | |
| | 5 | i.v. | 1 | 38.0 | 38.2 | 37.6 | 37.6 | 37.8 | 37.8 | 37.8 | 38.2 | 38.4 | 38.5 | |
| | | | 2 | 38.5 | 38.0 | 37.5 | 37.0 | 36.9 | 37.1 | 37.4 | 37.4 | 37.5 | 40.7 | 40.8+ |
| | 10 | s.c. | 1 | 38.7 | 38.2 | 36.2 | 37.1 | 35.2 | | | | | | |
| | | | 2 | 38.0 | 37.0 | 37.9 | 34.9 | 34.7 | | | | | | |
| | 10 | i.v. | 1 | 37.0 | 37.2 | 36.3 | 35.8 | 35.2 | 35.3 | 35.2 | 35.3 | 35.2 | 38.3 | 37.9 |
| | | | 2 | 37.0 | 37.4 | 36.3 | 35.8 | 35.2 | 35.0 | 35.0 | 35.0 | 35.7 | 38.8 | 37.5 |
| Chlorpromazin | 5 | i.v. | 1 | 38.9 | 37.6 | 37.1 | 37.2 | 37.5 | 37.9 | 37.9 | 37.9 | 37.9 | 38.9 | |
| | | | 2 | 38.9 | 37.6 | 37.1 | 37.2 | 37.5 | 37.9 | 37.9 | 37.9 | 37.9 | 38.0 | |
| Hexobarbital | 50 | i.v. | 1 | 38.0 | 36.8 | 37.5 | 37.5 | 37.6 | | | | | | |
| | | | 2 | 38.0 | 36.0 | 37.5 | 37.5 | 37.6 | | | | | | |

TABLE 9.—ANTIPYRESIS ON FEBRILE GUINEA PIGS (COLI FEVER)

| Compound | Dose, mg./kg. (subcutaneous) | Number of animals | Maximum drop, °C. (average values) | Normalization after minutes |
|---|---|---|---|---|
| Wh7286 | 0.05 | 5 | 0.0 | |
| | 0.10 | 10 | 0.8 | 120 |
| | 0.25 | 10 | 1.7 | 120 |
| | 0.5 | 15 | 2.1 | 180 |
| | 5.0 | 5 | 3.2 | 300 |

TABLE 10.—POTENTIATION OF THE THIOPENTAL NARCOSIS OF THE CAT BY THE PRELIMINARY ADMINISTRATION OF WH7286.

| Dose, mk./kg. Wh7286, 10 mins. prior to thiopental | Dose, mg./kg. i.v. thiopental | Deepest narcosis stage (Magnus-Girnd) | Duration of the narcosis, minutes | Δ Stage | Δ Duration |
|---|---|---|---|---|---|
| | 5.0 | III | 5–10 | | |
| | 7.5 | V | 12–18 | | |
| | 10.5 | V–VI | 25–35 | | |
| | 12.0 | VI | 50–80 | | |
| | 25.0 | Total | Total | | |
| 1.0 | 5.0 | V–VI | 35–40 | II–III | 25–35 |
| 0.5 | 7.5 | VI | 20–50 | I | 0–40 |
| 1.0 | 7.5 | VI | 60–90 | I | 40–80 |
| 1.0 | 10.5 | VI | 60–190 | 0–1 | 25–165 |
| 1.0 | 20.0 | VI | Dead | | |

(b) *Dog (Table 11).*—On 8 wide-awake trained dogs (both sexes), weighing from 9–12 kgs., respiration frequency and volume were investigated under the influence of Wh7286. The recording instrument used was a back-pressure tube (Fleisch) mounted inside of a respiratory mask, as a measuring instrument a high-sensitivity differential manometer (Hoffmeister), as an amplifier a Hottinger measuring bridge and a carrier frequency demodulator channel according to Schwarz.

(9) *Anticonvulsive action in mice (Table 12).*—For (a), 20 animals were used for each dose, for (b), (c) and (d) 10 animals. In all shock tests the suppression (nullification) of the tonic spasm component was evaluated as an effect.

(a) *Vertically-induced cramp (spasm).*—The animals were shocked across a cranium electrode and a nose electrode with 20 ma., 50 Hz., impulse duration of 10 msec. for 1 second.

*Result.*—Medium-high effect.

(b) *Metrazol cramp.*—Into each sober (empty stomach) mouse was intravenously injected 50 mg./kg. of Metrazol, with a solution concentration of 0.2/ml. per 20 grams of the animal's weight within 4 seconds.

*Result.*—Ineffective.

(c) *Nicotine cramp.*—1.5 mg./kg. of nicotine base, intravenous, otherwise as in (b).

*Result.*—Medium-high effect.

By intravenous doses of 2–10 γ/kg. of nicotine base the patellar reflex of intact cats narcotized with chloralose-urethane is inhibited (suppressed) for a short time. Wh7286 cannot inhibit this inhibition in doses of up to 3 mg./kg.

(d) *Strychnine cramp.*—For this purpose 0.75 mg./kg. of strychnine nitrate was injected intravenously. In all other respects, as with (b).

*Result.*—Ineffective.

In intact cats narcotized with chloralose-urethane the strychnine-hyper reflexes is likewise not inhibited by tolerable doses of Wh7286.

TABLE 11.—THE EFFECT OF WH7286 ON THE RESPIRATORY VOLUME AND FREQUENCY IN A VIGILANT DOG

| Dose mg./kg. (intravenous) | 1 | | 3 | |
|---|---|---|---|---|
| No. of animals | 5 | | 3 | |
| | Volume [1] l./min. | Frequency [1] inhalations/min. | Volume [1] l./min. | Frequency,[1] inhalations/min. |
| Initial state | 2.7 | 23 | 2.3 | 25 |
| 1 minute | 2.6 | 23 | 2.1 | 15 |
| 5 minutes | 2.4 | 14 | 1.9 | 21 |
| 10 minutes | 2.3 | 13 | 2.4 | 23 |
| 20 minutes | 2.4 | 12 | 3.1 | 20 |
| 30 minutes | 2.5 | 12 | 2.6 | 16 |
| 45 minutes | 2.3 | 11 | 2.5 | 15 |
| 60 minutes | 2.4 | 12 | 2.4 | 14 |

[1] Average values.

*Result.*—Slight lowering of the breath depth and frequency.

TABLE NO. 12.—ANTICONVULSION ACTION—MICE

| Compound | Mode of administration | Toxicity, DL50, mg./kg. | Electrically induced cramp, DE50, mg./kg. | Cardiazole cramp, DE50, mg./kg. | Nicotine cramps, DE50, kg. | Strychnine cramp, DE50, mg./kg. |
|---|---|---|---|---|---|---|
| Wh7286 | Subcutaneous | 100 | 22 | [1] O.W. | 10 | [1] O.W. |
| Phenobarbital | Per os | 180 | 15 | 18 | 9 | 60 |
| Diphenylhydantoin | Per os | 300 | 10 | 18 | 24 | 25 |
| Nephenesine | Subcutaneous | 1,300 | 165 | | | 400 |
| Phenyramidol | do | 475 | 80 | | | 200 |

[1] Without effect.
With oral administration shock after 3 hours.
With subcutaneous administration shock after ½ hour.

(10) *Antitussive action.*—[Literature: Goesswald, Arzneimittelforschung 1958, vol. 8, page 550.]

In guinea pigs that had been exposed to a 20% citric acid spray, a preliminary treatment with 0.1, 0.25, 0.5 and 1.0 mg. of Wh7286 (subcutaneously administered one-half hour earlier) brought about a distinct inhibition of the coughing fit.

*Result.*—Strong effect.

(50% inhibition by codeine phosphate, 5–10 mg./kg.; subcutaneous.)

(11) *Antagonistic action against centrally-exciting compounds in rats.*—The general aspect of poisoning by apomorphine, tryptamine and methamphetamine is based above all on the liberation of biogenic amines. In the following table the inhibition or the prevention of cramps (spasms) and stereotype reactions of the rat is considered to constitute a measure for the action of the compounds.

TABLE 13

| Distinct suppression of the poisoning picture of— | by the preliminary subcutaneous administration of— | |
| --- | --- | --- |
|  | Wh7286, mg./kg. | Chlorpromazine, mg./kg. |
| Tryptamine 40 mg./kg. intravenous | 30 | 10 |
| Apomorphine 1.25 mg./kg. intravenous | 20 | 40 |
| Methamphetamine 10 mg./kg. intravenous | 20 | 25 |

Result:
   With tryptamine ___ Wh7286 <Chlorpromazine
   With apomorphine _ Wh7286 >Chlorpromazine
   With methamphetamine ___ Wh7286 Chlorpromazine

(12) *Electroencephalographic investigations:*

(a) *Cats.*—In a total of 8 animals, carrying electrodes implanted in the cranium, the influence of Wh7286 on the spontaneous-EEG, as well as on the reticularly, rhinencephalically and thelamically induced potentials was measured. For details regarding the method and practice, see Hoffmeister, Psychopharmacologia, 1961, vol. 2, p. 27, and Pfluger's Archiv, 1961, vol. 273, p. 396.

(i) *Spontaneous-EEG* (10 tests); dosage: 1–5 mg./kg. i.v.—Leading-off was via the frontal and cocipital cortex, veutromedial thalamus, nucleus caudatus, hippocampus (dorsal), temporal pole, and mesencephalic reticular formation.

*Result.*—Within 1–10 minutes after the injection there occurs a distinct activation of the spontaneous-EEG, which is distinguished particularly in the cortex by a high-frequency low-voltage EEG, and in the temple-pole (thalamic) fibers of some animals by heaped-up 20–30 Hz. amygdalae. With higher doses (5 mg./kg.) there may during this time appear cramp potentials, such as separate spikes or short series of spikes-waves (possibly in rhythm measurable in seconds), which frequently spread synchronously with motoric tics (sporadic muscular contractions) into the fore extremities. During this time the animals are already in the side position. In the further course there appear with majority of cases, independently of the dosage, an increased number of 8–12 Hz. temporal pinions or to bursts of printed high-voltage waves which can frequently be recognized synchronously in all the leading-off conductors. Simultaneously therewith, the vigilance tonus (tonic spasm) in the tonsillar formation and in the hippocampus region decreases, as can be recognized from the attenuation of the 30 Hz. pinions, or in the disappearance of the 3–5 Hz. rhythm.

(ii) *Induced potentials* (Table 14).—Under the influence of Wh7286 (3 mg./kg. intravenous), chlorpromazine (5–7 mg./kg., i.v.) morphine (5 mg./kg., i.v.) and hexobarbital (20 mg./kv., i.v.), administered to 3 cats carrying chromically implanted electrodes, was comparatively tested for potentials induced by intracerebral electrical irritations (stimuli), as well as for the EEG-vigilance reaction incited by a buzzer signal. There was thus evaluated (interpreted):

(1) Induced potentials, which can be led off from the frontal cortex by a low-frequency electric stimulus of the formatio reticularis mesencephalica. The frequency of the stimuli was 5 Hz. Each separate stimulus is answered in the cortex by a potential variation of a special form and amplitude.

(2) Recruiting potentials in the cortex, which were induced by an electrical stimulus (5 Hz.) of the ventromedial thalamus.

In one animal, there was furthermore investigated the form of the after-discharge in response to an electric stimulus applied to the temporal pole, under the influence of the aforementioned compounds.

(b) *Rabbits:*

(i) *Spontaneous-EEG.*—In rabbits, there occurs under the influence of Wh7286 (1–5 mg./kg., intravenous) a distinct increase of the potential, accompanied by a decrease of the frequency, and by synchronization.

The typical theta rhythm in the hippocampus lead-off branch is blocked. The maximum effect appears about 10 minutes after the injection. The vigilance reaction in response to an acoustical stimulus is generally suppressed, that in response to a painful stimulus is readily attenuated. After the administration of 10 mg./kg. of Wh7286 (i.v.) or more generalized shocks, which are accompanied by a high mobility, become predominant.

(ii) *EEG-arousal, from intracerebral stimuli.*—The influence of the threshold of the EEG-arousal reaction in response to intracerebral stimula was tested on rabbits, The initiation of the reaction was effected by a high-frequency stimulus (250 Hz.) in the reticularis mesencephalicus formation, in the ventral hypothamus, and in the ventromedial thalamus. Stimulus threshold with a nontreated animal, about 0.1–0.5 volt for the reticularis stimulus, about 1–3 volts for the thalamus and hypothalamus stimuli. Threshold variation in Δ volts maximum; this means that, with every animal, the maximum threshold rise achieved within 60 minutes after the administration is, as compared with the preliminary check test of the arousal reaction (in volts), each EEG variation in the cortex or hippocampus lead-off branches (as the case may be) with the symptoms typical for the reaction (small amplitude, high frequency or synchronization, as the case may be).

Evaluation: Cortex arousal, at least 10 msec., and for the hippocampus arousal, at least 6 seconds per stimulus.

(iii) *Antagonistic action against centrally active compounds in the EEG.*—The known EEG effects of methamphetamine (5 mg./kg., i.v.) LSD (100 mg./kg., i.v.), Levallorphan (10 mg./kg., i.v.) in rabbits were distinctly blocked by 2 mg./kg. i.v. of Wh7286; 5 mg./kg. i.v. suppressed an onset of nicotine spasms.

The EEG activation brought about by nicotine (0.5–3.0 mg./kg., i.v.) physostigmine (0.4 mg./kg., i.v.) and tryptamine (5 mg./kg., i.v.) could, however, not be broached by tolerable doses of Wh7286.

(13) *Surgical tests* (Table 15).—The effects of Wh7286 described above (viz., stuporous condition, analgesia, retraction) made it seem reasonable to test the compound in experimental operations instead of narcotics.

TABLE 14

| Compound | Wh 7286, 3 mg./kg. i.v. | Chlorpromazine, mg./kg. i.v. | | | Morphine, 5 mg./kg. i.v. | | | Hexobarbital, 20 mg./kg. i.v. | | |
|---|---|---|---|---|---|---|---|---|---|---|
| | | 5 | | 7.5 | | | | | | |
| Cat No. | 44 | 43 | 39 | 44 | 43 | 39 | 44 | 43 | 39 | 44 | 43 | 39 |
| No. of tests | 1 | 1 | 2 | 1 | 1 | 1 | 1 | 1 | 1 | 1 | 1 | 1 |
| Response in the cortex to an electrical reticular stimulus. | (↓) | ↓ | (↓) | ↓ | ↓↓ | ↓ | ↓ | ↓ | ↓↓↓ | ↓↓↓ | ↓↓↓ | ↓↓↓ |
| Recruiting | ↑ | ↑↑↑ | ↑↑ | φ | ↑↑↑ | ↑ | ↓ | ↓↓ | ↓↓↓ | ↓↓↓↓ | (↑)↓↓ | ↓↑↑ |
| Tonsillar after discharge | | | ↓ | | | ↓↓ | | ↑ | | | | ↓↓ |
| Vigilance reaction (Busser signal) not tested. | | ↓↓↓ | ↓↓↓ | ↓↓↓ | ↓↓↓ | φ | ↑↑↑ Permanent arousal ↑↑↑ ↑↑↑ | | | ↓↓↓ | ↓↓↓ | ↓↓↓ |

Significance of symbols:
  ↓↓↓ =distinctly attenuated
  ↓↓ =attenuated
  ↓ =slightly attenuated
  φ=o.b. (without outstanding effect)
  ↑ =slightly stronger
  ↑↑ =stronger
  ↑↑↑ =distinctly stronger

TABLE 15

| Animal kind | Dosage, mg./kg., i.v. | Number of animals | Report |
|---|---|---|---|
| Cat | 5 | 1 | Blood-drawing incision on the rear extremity and subcutaneous incision without reaction, gentle repulsive movements on bluntly separating the muscular flesh, no reaction during the skin suture. |
| | 6 (2 x 3) | 1 | Laparatomy, incisions into the skin and subcutaneous tissues, with no reaction; piercing incision into muscular tissues and peritoneum, with no defensive movements, likewise no pressing lifting out the colon, and digital probing of the abdominal cavity; 80 minutes after the end of the operation, capacity to stand upright again restored. |
| | (¹) | 1 | Trepanation, stereotactic insertion of 30 deep-seated electrodes, and attaching (by screws) an electrode socket to the cranial roof. Duration of the operation: 3½ hrs. Normal course of the operation. |
| Dog ² | 1 | 1 | Laparatomy, incision into the skin, incision into the peritoneum and on lifting out the heart and colon, no reaction; suture of the muscular tissues, subcutaneous tissues and skin with no reaction; immediately after the operation the animal is attentive, appealable, tries to stand upright. |
| Dog ³ | 2 | 1 | Laparatomy: Incisions into the skin, subcutaneous tissues, peritoneum, with no reaction; on pulling out the colon and mesenterial root no straining, abdominal integuments greatly relaxed; sutures borne with no reaction. Animal gets on its feet immediately at the end of the operation and runs stactically. |
| Rhesus monkey. | 2-3 .5 | 1 | Intubation, successful with 2 animals. 3 minutes after the injection, side position is suffered; after 10 minutes incision into the skin at the back; blunt palpation of the subcutaneous tissues and of the muscular sheath, with no repulsive movements; skin suture, with no reaction. After 60 minutes, can sit down, and after 170 minutes stands upright spontaneously. |
| | 2 | 1 | Surgical care of a laceration (11 cm. long, on the arm). 5 minutes after injection no repulsive movements. Skin suture borne without reaction. About 20 minutes after the injection, the animals sit down spontaneously. Within the next 2 hours the hurt extremity is not spared. |
| | 2-4 | 4 | Intubation, successful with 2 animals, without any particular defense. With 2 animals, insertion was impossible due to resistance. Repetition with these animals, after a week intubation was successful. |
| | ⁴ 3 | 2 | |

¹ 5 preliminary 5 x 2 within 60 minutes, then 5 Evipon-Na.
² Premedication: 0.1 mg./kg. (subcutaneous) of Sandolectil 30 minutes before.
³ Without premedication.
⁴ +3 thiopental 5 minutes later.
*Result.*—Distinct analgesia, particularly on the skin, pronounced muscular relaxation, conscience apparently maintained partly. Striking bloodlessness of the skin.

II. *Predominantly peripheral effects*

(14) *Inhibition of oedema:*

(a) *Oedema of the rat's paw (Table 16).*—Due to the injection of baker's yeast (20%-suspension, 0.1 ml.) into the planta pedis of rats an oedema is formed. The intensity of said oedema (dropsy) is measured by means of the antiphlogmeter WK 8 mentioned by Kemper and Ameln (Zeitschrift fur experimentelle Medizin, 1959, vol. 131, p. 408), obtainable from the Gesellschaft fur Elektrophysikalischen Apparatebau Bensheim. The administration of the test compounds took place 4 hours after the oral administration of yeast, the testing of the antioedomatic effect every hour during the following 3 hours. The inhibition of the oedema was indicated in percent of a preliminary test, i.e., calculated on the intensity of the oedema shortly before the administration of the test compounds or in scale divisions of the antiphlogmeter.

*Result.*—Distinct effect, somewhat like that of prednisone. The same effect was obtained with adrenalectomized animals; no antagonism as compared with serotonin is present in this test.

(b) *Formalin oedema of the rat (Table 17).*—In this instance the same procedure as stated under (a) was adopted. Instead of yeast 0.1 ml. of a 3%-formalin solution was injected into the planta pedis.

*Result.*—Distinct effect, about as with prednisone.

(c) *Zymosan-oedema test, according to Lauenstein, Friedrich and Haberland, Med. exp., 1962, vol. 26, p. 200:*

| Dose | Number of animals | Percent inhibition |
|---|---|---|
| 2 mg./kg. per os | 10 | 11. |
| 8 mg./kg. per os | 10 | 31. |
| 16 mg./kg. per os | 10 | 31 (Prednisone 29% inh.). |
| 1 mg./kg. subcutaneous | 10 | 22. |
| 2 mg./kg. subcutaneous | 10 | 45 (Prednisone 19% inh.). |
| 4 mg./kg. subcutaneous | 10 | 42. |
| 8 mg./kg. subcutaneous | 10 | 50 (Prednisone 21% inh.). |
| 16 mg./kg. subcutaneous | 10 | |
| 0.5 mg./kg. i.p | 10 | 9. |
| 1.0 mg./kg. i.p | 10 | 17. |
| 2.0 mg./kg. i.p | 10 | 22. |
| 4.0 mg./kg. i.p | 10 | 22. |
| 8.0 mg./kg. i.p | 10 | 22. |
| 16.0 mg./kg. i.p | 10 | 40 (Prednisone 28% inh.). |

(d) *Formalin-oedema test, according to Domenjoz and Theobald, Exper., 1958, vol. 14, p. 33.*—Dosage, as under (a), except that 0.1 ml. of a 3%-formalin solution was injected into the back paw of each animal.

| Dose | Number of animals | Percent inhibition |
|---|---|---|
| 2 mg./kg. per os | 10 | 6. |
| 8 mg./kg. per os | 10 | 15. |
| 10 mg./kg. per os | 10 | 22 (Prednisone 10% inh.). |

(e) *Cotton-pellet test.*—Procedure: Two sterilized cotton pellets, weighing 10 mg. were implanted below the neck skin of female albino rats under Evipan narcosis. The compound to be tested was administered per os 7 times at 24-hour time intervals. On the eighth day the animals were killed with chloroform, the cotton pellets removed and their dry weight determined. The inhibition was expressed in percent of a sodium chloride control test. For each dose 10 animals and 20 cotton pellets, respectively, were used.

| Dose/day | Percent inhibition |
|---|---|
| 0.5 mg./kg. per os | 8 |
| 1 mg./kg. per os | 17 |
| 2 mg./kg. per os | 11 |
| | (Prednisone 34% inhibition) |
| 4 mg./kg. per os | 19 |

*Recapitulation.*—Wh7286 has a distinct antiphlogistic effect, above all in the zymase test, which is nearly in agreement with the results obtained with the yeast-induced oedema. In the essentially more "stringent" formalin-induced oedema test an effect is likewise detectable. The effect is about of the order of magnitude of prednisone. In the cotton-pellet test Wh7286 is only faintly efficacious.

(15) *Local anaesthesia:*

(a) *Conduction anaesthesia.*—[Experimental procedure according to Wirth, Deutsche Zahnarztliche Zeitschrift, 1960, vol. 15, p. 1270.]

Into the rat tail were injected neutral solutions of physiological NaCl (pH 7.1–7.3) containing 0.1%, 0.5% and 1.0% Wh7286. The tail was then electrically irritated. With 0.1 Wh7286, there was no effect. With 0.5%, complete conduction anaesthesia. After 3.2 minutes, and with 1.0%, complete conduction anaesthesia after 2.9 minutes. (Average values of 5 animals per dose.)

*Result.*—Strong effect (order of magnitude like that of lidocaine/baycaine).

(c) *Surface anaesthesia (Table 18).*—Brought about by a neutral 0.1, 0.5, 1.0% solution in physiological NaCl dropped into the connective membrane cyst near the rabbit's cornea. For the purpose of comparison a procaine solution having the same concentration was injected into the other eye.

*Result.*—Distinct effect (at least twice as strong as with Novocain).

TABLE 16.—INHIBITION OF A YEAST-INDUCED OEDEMA OF THE RAT'S PAW

| Compound | Dose, mg./kg. per os | No. of Animals | Maximum inhibition, in percent of the preliminary control test, within 180 minutes |
|---|---|---|---|
| Wh7286 | 2 | 15 | 29 |
| | 4 | 35 | 49 |
| | 8 | 10 | 45 |
| | 16 | 20 | 44 |
| | 31.5 | 10 | 38 |
| | 63 | 5 | 57 |
| Prednisone | 2 | 15 | 23 |
| | 4 | 25 | 47 |
| | 8 | 20 | 45 |
| | 16 | 20 | 46 |
| | 31.5 | 10 | 41 |
| | 63 | 10 | 50 |
| Phenylbutazone | 2 | 10 | 33 |
| | 4 | 30 | 46 |
| | 8 | 20 | 46 |
| | 16 | 15 | 56 |
| | 31.5 | 10 | 52 |
| | 63 | 10 | 57 |
| Amidozon | 2 | 10 | 25 |
| | 4 | 15 | 26 |
| | 8 | 10 | 34 |
| | 16 | 20 | 36 |
| | 31.5 | 10 | 37 |
| | 63 | 10 | 51 |
| | 100 | 5 | 61 |
| Physiological NaCl solution | | 65 | 10 |

TABLE 17.—INHIBITION OF A FORMALIN OEDEMA IN THE RAT PAW

| Compound | Dose, mg./kg. per os | No. of Animals | Maximum inhibition, in percent of the preliminary control test, within 180 minutes |
|---|---|---|---|
| Wh7286 | 4 | 5 | 32 |
| | 8 | 5 | 25 |
| | 16 | 5 | 37 |
| Prednisone | 4 | 5 | 37 |
| | 8 | 5 | 29 |
| | 16 | 5 | 33 |
| Phenylbutazone | 4 | 5 | 33 |
| | 8 | 5 | 45 |
| | 16 | 5 | 44 |
| Physiological NaCl solution | | 35 | 16 |

TABLE 18.—CUTANEOUS (EPIDERMAL) ANAESTHESIA

| Concentration | Animal No. | Duration of the entire anaesthetic condition (100 dabs with fine brush every 2 minutes) Novocain | Wh7286 |
|---|---|---|---|
| | | Min. | Min. |
| 0.1% | 1 | 0 | 10 |
| | 2 | 0 | 12 |
| 0.5% | 3 | 8 | 26 |
| | 4 | 8 | 28 |
| 1.0% | 5 | 22 | 36 |
| | 6 | 22 | 55 |
| | 7 | 20 | 30 |
| | 8 | 18 | 60 |

(16) *Effect on smooth-muscle organs:*

(a) *Isolated guinea-pig intestine.*—By the Magnus method the following values were obtained:

TABLE 19

| Compound | Inhibition of the acetylcholine contraction by $\gamma/l.^1$ | $BaCl_2$-contraction by $\gamma/l.^2$ | Nicotine contraction by $\gamma/l.^3$ |
|---|---|---|---|
| Wh7286 | >10,000 | 25–100 | 50 |
| Chlorpromazin | 2,000 | 900 | 4,000 |
| Morphine | >10,000 | 30,000 | 100 |
| Pethidine | >10,000 | 650 | 850 |

[1] Acetylcholine, $1:2.10^6$.  [2] $BaCl_2$, $1:10^4$.  [3] Nicotine, $1:10$.

*Result.*—No particular anti-acetylcholine effect, strong anti-BaCl₂ effect, strong anti-nicotine effect.

(b) *Isolated seminal vesicle (rat).*—The contraction of the seminal vesicle ("Samenblase") brought about by 2000γ of Adrenalin/l. was inhibited 50% by 1000γ of Wh7286. The corresponding value for chlorpromazine is 10γ/l.

*Result.*—No specific effect.

(c) *Isolated uterus (rabbit).*—On the isolated uterus of non-pregnant rabbits concentrations of 10γ to 100 mg./l. have no specific effect; 10γ to 10 mg./l., too, had no specific effect on the organ contracted by Adrenalin (1 mg./l.). Only at 50–100 mg. of Wh7286 did a distinct inhibition of the Adrenalin-contraction become apparent.

(17) *Anti-histamine effect.*—In the experimental method according to Schaumann, viz. inhalation of an aqueous 0.15% histamine hydrochloride spray, by a guinea pig, 2.5 mg. Wh7286/kg., s.c., did not show any anti-histamine effect.

(18) *Anti-asthma effect.*—Sensibilization of guinea pigs by two intraperitoneal injections of chicken egg-white (5% aqueous solution, 0.5 ml. per dose). After 14 days' inhalation of a 5%-aqueous egg-white spray.

By a preliminary administration of 1 mg. Wh7286/kg. (subcutaneous) slight protection; by 5 mg./kg. complete protection. Reduction of the intensity of the eggwhite asthma by about 50% effected with 2.5 mg./kg. With these doses the animals were weak.

*Result.*—Distinct anti-asthma effect (eggwhite-induced).

(19) *Effect on intestinal mobility (excretion of bone black).*—[Literature: Journal of Pharmacy and Pharmacology 1957, vol. 9, p. 380.]

In full-grown rats the passage through the small intestine of a suspension of bone black in a tragacanth mucilage was inhibited 10% by Wh7286 (1 mg./kg. per os), and 20% by 5 mg./kg., p.o.

(20) *Diuresis.*—In the slightly modified experimental procedure according to Burn (cf. Wirth, Deutsche Medizinische Wochenschrift, 1957, p. 1908), and with a total of 20 rats, the excretion of urine was slightly increased in the first six hours by 0.05 mmol of Wh7286/kg., p.o. (=11 mg./kg.). The excretion of Na⁺, K⁺, Cl⁻ and the titration acidity of the urine were not significantly changed.

*Result.*—Slightly increased water diuresis.

(21) *Examination of the synaptic effect:*

(a) *Mayoneural transmission.*—In the narcotized cat the contraction of the musc. tibialis ant. in response to an indirect irritation by Wh7286 (1–10 mg./kg., i.v.) is not inhibited. Succinylcholine/iodide (0.2 mg./kg., i.v.) prevents the contraction. The synaptic nerve-muscle transmission (relay) is thus not impaired by Wh7286.

(b) *Nictitating membrane.*—In the narcotized cat, Wh7286 in doses of 1–2 mg./kg., i.v. causes a distinct, long-lasting "nictitating membrane" contraction; it is not attenuated by the preliminary administration of a ganglion blocking substance (Ecolid, 0.5 mg./kg., i.v.) or by the extirpation of the ganglion cervicale superius. The contraction of the "nictitating membrane" is intensified by Wh7286, whereas the contraction brought about by arterenol remains unaffected. As is known, chlorpromazine (0.2 mg./kg., i.v.) diminishes the contraction of the "nictitating membrane" in the case of a preganglionar irritation of the sympaticus at the neck. The subsequent administration of Wh7286 (2 mg./kg., i.v.) and preganglionar irritation causes a further lessening of the "nictitating membrane" contraction; simultaneously therewith the blood-pressure-lowering action of chlorpromazine.

(22) *Effect on the circulation:*

(a) *Dog and cat (vigilant) Table No. 20.*—A polyethylene tube was implanted into the Arteria carotis or femoralis of the animals under ether or halothane narcosis. The administration of Wh7286 took place only after the animals had completely recovered from the narcosis. Measuremnts of the systolic and diastolic blood pressure, and of the pulse frequency by means of a Schwartz blood-pressure chamber; recording effected by means of a scriber. Wh7286 was passed into the vena jugularis or was administered intramuscular.

TABLE NO. 20.—BEHAVIOR OF THE CIRCULATORY SYSTEM IN THE WIDE-AWAKE DOG.

| Dog No. | Weight, kg. | Sex | Wh7286 mg./kg. | Initial condition | Behavior of the vascular system under Wh7286 |
|---|---|---|---|---|---|
| 1 | 10.0 | Male | 1 i.v. | BD 120/90 | BD ↑ 135/100 in 5 minutes in 70 min. up to 120/90 ↓ 60 in 8 mins; stable ↓ up to end of test (90 min.) |
|   |   |   |   | P 100 |   |
| 2 | 9.0 | Female | 3 i.v. | BD 130/90 | BD ↑ 180/125 ↓ 150/90 ↓ 120/90 |
|   |   |   |   | P 90 | P ↓ 60 in 10 min; constant 60 min; 30 after 4 hours. |
| 3 | 8.7 | Female | 3 i.v. | BD 110/70 | BD ↑ 160/130 in 10 min; in 60 min. up to ↓ 120/80; 140/86 after 4 hours. |
|   |   |   |   | P 70 | P ↓ 40 in 15 min; constant for 60 min; 45 after 4 hours. |
| 4 | 10.5 | Female | 5 i.v. | BD 130/70 | BD ↑ 165/120 in 20 min; ↓ in 90 min. to 150/120; 120/90 after 4 hours |
|   |   |   |   | P 80 | P ↓ 45 in 10 min; 90 for 90 min; 70 after 4 hours. |
| 5 [1] | 10.5 | Male | 1 i.v. | BD 120/90 | BD ↑ 200/150 in 10 min; in ↓ 60 min. to 120/60. |
|   |   |   |   | P 150 | P ↓ 70 in 60 min. |
| 6 [2] | 9.1 | Male | 3 i.v. | BD 120/90 | BD ↑ 250/190 in 10 mins; ↓ in 120 min. to 165/110. |
|   |   |   |   | P 165 | P ↓ 80, at once constant. |

[1] Premedication: Atropine sulf. 0.05 mg./kg. i.v., 10 minutes later Wh7286.
BD=Blood pressure.   P=Pulse.

Doses of 1–3 mg./kg., i.v. caused in the dog a medium-high increase of the blood pressure which slowly fades away again after 10–60 minutes. Surprisingly, a distinct brady-cardia was observed.

Following the administration of atropine, the rise in blood pressure by Wh7286 is substantially more distinct, and a drop of the pulse frequency below physiological values is in the present instance prevented to a large extent.

With a total of 12 cats and Wh7286 doses of 1–5 mg./kg. basically similar results were obtained. On repeated injection of the compound into the same animal the circulatory reactions became slightly weaker, although there was no pronounced tachyphylaxy.

Succinyl choline (1 mg./kg., i.v.), d-tubocurarine (0.2 mg./kg., i.v.), thiopental (up to 10 mg./kg., i.v.) do not substantially change the effect of Wh7286 on the circulation of dogs, once the blood-pressure fluctuations specific for each compound have died away.

(b) *Narcotized cat (chloralose-urethane).*—(Blood pressure in the vena femoralis recorded via a Hg manometer.)

In doses of 0.3–2.0 mg./kg., i.v. Wh7286 causes an increase of the middle blood pressure of 20–80 mm. Hg for 10 minutes, up to 2 hours. In part of the animals the blood-pressure rise was preceded by a more pronounced negative prevariation. In some cases there occurred irregularities during the blood-pressure rise.

By a preliminary administration of atropine (0.05 mg./kg., i.v.) the blood-pressure reaction was slightly intensified, not inhibited by yohimbin (1.0 mg./kg., i.v.), Ecolid (0.5 mg./kg., i.v.) and chlorpromazin (0.2–1.0 mg./kg., i.v.). On the blood-pressure reaction of serotonin, tryptamin and noradrenalin, Wh7286 has no specific effect. After the extirpation of the carotis sinus follows a blood-pressure drop, the "nictitating membrane" reaction is not altered.

(c) *Spinal or beheaded cat.*—In an artificially "breathing" spinal cat (decapitation below the medulla oblongata) 2 mg./kg. Wh7286, i.v., brought about a rise in blood pressure. After reaming out the spinal cord there occurred a rise in blood pressure likewise with those blood-pressure test objects that reacted well to adrenalin and arterenol administered after 0.5–2 mg./kg., i.v., Wh7286. In the animals no longer possessing a brain and spinal cord, the pulse frequency was not impaired by the compound.

(d) *Effect on the peripheral vascular vessels.*—(1) On the vascular system of the frog (*Rana esculenta*) prepared according to Lawes-Trendelenburg, 200–500–1000γ Wh7286 had a slight vasoconstrictive effect.

(2) On the corresponding warm-blooded preparation obtained according to Kochmann and Katel by flooding the lower half of a guinea-pig's trunk, a distinct lessening of the flow after 500–1000γ ensued in 6 of 9 tests.

(3) Finally, in a rabbit's ear transfused (flooded) according to Bissenski-Rischlieter there arose likewise a tendency to a slight vasoconstriction; still any dose-effect relationship was not discernable.

(4) In a narcotized dog, measurements of the rate of flow of the blood through the arteria femoralis by means of the Vater flowmeter gave the following data:

TABLE 21

| Dog | Start | Minutes, after 2 mg. of Wh7286/kg., i.v. | | | |
|---|---|---|---|---|---|
| | | 1 | 3 | 10 | 30 |
| (1) blood pressure | 145/100 | 135/105 | 165/140 | 170/140 | 170/140 |
| Amount of blood, ml/min | 29 | 9 | 18 | 15 | 13 |
| (2) Blood pressure | 135/100 | 140/120 | 145/125 | 140/120 | 130/110 |
| Amount of blood, ml/min | 7 | 5.7 | 4.2 | 5.3 | 9 |

As will be seen, the decrease of the peripheral flow of blood is not independent of the pressure.

According to Langendorff, 0.1–100γ Wh7286 have on the isolated guinea pig heart no specific effect as regards the amplitude and rate of flow through the coronary artery; with higher doses diminution of both amplitude and rate of flow have been established. No influence on frequency.

(b) *Oxygen content of venous coronary-sinus blood.*—In order to obtain an indication as to the effect on the coronary the $O_2$-content of the venous coronary-sinus blood of the intact narcotized dog under the influence of Wh7286 was determined by means of a catherization of the heart.

TABLE 22

| Dose, mg./kg., i.v. | Start | $O_2$ content of the venous coronary-sinus blood | | |
|---|---|---|---|---|
| | | 3 min. | 10 min. | 30 min. |
| 1.5 | 34% | 31% | 31% | 36% |
| 2.0 | 31% | 25% | 29% | |
| 2.3 | 32% | 28% | 29% | |
| 2.5 | 29% | 27% | 26% | |

In the same manner as in the non-narcotized animal these tests showed an increase of the systolic and diastatic blood pressure, the amplitude of the latter decreased slightly.

(c) *Effect on the electrocardiogram.*—On enfeebled trained dogs the EKG (bipolar standard lead-off branches, I, II and III) was taken up under the influence of 1–3 mg./kg., i.v. and 5–10 mg./kg. intramuscular by means of subcutaneous needle electrodes. Recording was done on a "Schwarzer" multiple-channel direct scriber. With all animals there appeared shortly after the administration of the compound a pronounced bradycardia (abnormally slow heat-action) with emphatic respiratory arrhythmy. The latter may have been due to the strong sedation of the dogs.

In 2–16 administrations on 13 animals there occurred, about 10–40 m. after the administration of 1–3 mg./kg. Wh7286, short-timed interspersions of extra ventricular systoles. In view of the frequency of heart-rhythm anomalies in non-narcotized dogs this finding is of no particular importance. Said rhythm anomalies are, besides, frequently observed in man and dog in cases of peripheral sympathicomimetica.

(24) *Effort on the blood gases.*—On vigilant dogs the $O_2$ and $CO_2$ contents of arterial blood were determined by the Van Slyke apparatus before and after the administration of 1–3 mg./kg. Wh7286, i.v., every half hour over a period of time of 90–120 minutes. No change in the $O_2$ and $CO_2$ contents.

*III. Compatibility*

(25) *Toxicity, dose administered once:*

TABLE 23

| Animal kind | Mode of administration | DL50, in mg./kg. |
|---|---|---|
| Mouse | i.v. | 43±2.5.[1] |
| | s.c. | 121±13.0.[1] |
| | per os | 240±24.0.[1] |
| Rat | per os | 130±12.0. |
| Rabbit | i.v. | About 16. |
| Cat | i.v. | About 25. |

[1] Distribution according to Miller and Tainter. Proceedings of the Society of Experimental Biology and Medicine, 1944, vol. 57, p. 261.

(26) *Toxicity, repeated administration.*—Oral administration daily on 15 successive days:

| Dog | Kg. | Mg./kg. |
|---|---|---|
| I | 9 | 1 |
| II | 15.3 | 2 |
| III | 11.0 | 3 |

Weight of animal: practically no change.

Blood picture: red blood picture, no deviation; in the white blood picture of I, perceptible shift to the left and slightly higher BSR; (II) and (III) o.b.B.

Urine: with II, after the 11th and 15th injection slight turbidity due to albumin, a few erythrocytes in the sediment; with III only a trace of albumin after the 11th injection (III) inconspicuous.

Residual nitrogen: with (II), rise above the initial value after the 10th injection, again normal after the 15th injection; (II) and (III) o.b.B.

Liver activity: BSP—and thymol values o.b.B. On the day after the last administration, the animals treated with Evipan-Na were dead.

*Dissection*:

(I) Heart o.b.B., lung o.b.B., weight 9 g./kg.; liver congested; left kidney capsule, difficult to detach; right kidney, remaining abdominal organs, brain, o.b.B.

Histological observations: abcess in the left renal cortex, straited infiltrations and connective-tissue bands from the cortex into the interior of the kidney (secondary evidence), in several tubuli, cellular debris and albumin. Liver, spleen, had very much blood, otherwise o.b.B., adrenal gland o.b.B.

(II) Heart, o.b.B., lung o.b.B., weight 8.2 g./kg.; liver, spleen, highly congested; remaining abdominal organs, brain, o.b.B.

Biological observations: kidneys, epithelial debris in several tubules; spleen highly hyperaemic; adrenal glands, o.b.B.

(III) Heart, o.b.B.; lung, o.b.B.; weight, 10 g./kg.; old scars on the surface of the left kidney; capsule, detached with difficulty; right kidney, remaining abdominal organs, brain, o.b.B.

Histological evidence: liver and spleen, congested; epithelial debris and albumin in several tubules of the left kidnay.

*Recapitulation.*—No essential changes to be attributed to Wh7286.

(b) *Rats.*—Three groups, each comprising 10 young male and 10 female animals. Initial weight 60–70 grams.

Group (I): 10 mg./kg. in the Altromin feed.
Group (II): 40 mg./kg. in the Altromin feed.
Group (III): Altromin-control doses daily on 170 consecutive days.

The weight changes of the animals treated with Wh7286 deviated but little from the control data:

TABLE 24

| | Group I | | Group II | | Group III (controls) | |
|---|---|---|---|---|---|---|
| | ♂ | ♀ | ♂ | ♀ | ♂ | ♀ |
| At the start | 63 | 61 | 68 | 64 | 68 | 63 |
| After 42 days | 227 | 166 | 233 | 162 | 246 | 176 |
| After 98 days | 344 | 210 | 334 | 211 | 338 | 218 |
| After 161 days | 404 | 244 | 378 | 248 | 403 | 240 |

Blood: in the red and white blood picture, no deviations from the control tests.

Urine: in group III (controls), occassional traces of albumin, in the sediment laminar epithelia bacteria and phosphates; pH 6.1 to 7.3.

In Group II, more frequently traces of albumin; pH 6.1 to 6.6, otherwise as in the controls.

Group I, same as the controls; pH 6.1 to 6.4.
Further experimental evidence.
Group I:
  1 ♂ dead after 7 days
  1 ♀ killed after 94 days, ailing
Group II:
  2 ♂ dead after 10 and 18 days, resp.
  2 ♀ dead after 41 and 143 days, resp.
Group III:
  1 ♂ dead after 42 days (control)

The other animals show nothing noteworthy.
After 100 administrations, 2 male and 2 female animals of each group were killed with ether:
*Dissection*: macroscopic, no essential differences between controls and the Wh7286 animals.

Microscopic, numerous desquamated epithelial tissues in the renal tubuli, not rarely albumin, no distinct difference between the controls and the Wh7286 animals. The same obtains for the histological evidence detected in the liver.

(27) *Local compatibility (tolerance).*—Examination of (a)–(c) in 0.5, 1.0, 2.5 and 5.0% aqueous solutions, adjusted with HCl to pH 6.3 to 7.0 (percentages in terms of the base).

(a) 0.1 ml. intramuscular, rat thigh:

TABLE 25

| Killed after— | Dissection | | | |
|---|---|---|---|---|
| | 0.5% | 1% | 2.5% | 5% |
| 24 hours | {1. 2. 3.} o.b.B | {1. 2. 3.} Much fluid (lymph). | {1. 2. 3.} Very much fluid (lymph). | {1. 2. 3.} Much fluid (lymph). |
| 48 hours | {3. 4.} o.b.B | {4. 5. 6.} o.b.B | {4. 5. 6.} Much fluid (lymph). o.b.B | {4. 5. 6.} Much fluid o.b.B. |

(b) *Marginal vein, 0.1 ml., blocked for 1 minute, rabbit ear:*

TABLE 26

| 1% | 2.5% | 5% |
|---|---|---|
| 1. o.b.B | 1. o.b.B | 1. o.b.B. |
| 2. o.b.B | 2. o.b.B | 2. Slight inflammation, after 2 days o.b.B. |
| 3. Slight inflammation. | 3. Slight inflammation, after 2 days o.b.B. | 3. Slight inflammation, after 2 days o.b.B. |

(c) *Intracutaneous, 0.1 ml., rabbit ear,* in a 1–5% concentration causes a locally limited inflammatory infiltrate.

(d) *Intracutaneous, 0.1 ml., on the forearm of three experimental persons:*
0.1% and 0.5% solution (base) in a physiological NaCl solution, adjusted with HCl to pH 7.0 and 5.0, resp. Each swelling (lump) caused by 0.1 ml. (cc.). Except for the puncture injection was painless; extent of swelling and vicinity (location of the dermal lymph crevices) anaemic; in this region contraction of the erectorus pilorum ("goose pimples").

Anaesthesia in the swelling area during 15–20 minutes with the 0.1% solution, and about 60 minutes with the 0.5% solution. Thereafter no local irritating effect (as in the controls with the NaCl solution).

(28) *Additional tests with humans.*—The compound (weight predetermined) was dissolved in about 50 cc. of water (slightly acid) and taken in the early forenoon hours.

TABLE 27.—OBSERVATIONS

| Dose, mg./ person per os | Test Person I | Test Person II |
| --- | --- | --- |
| 2 | After 15 min. slows down somewhat. After 1 hour, o.B. | |
| 5 | | Somewhat tired after the first hour. |
| 15 | After 30 minutes, tired, pronounced sleepiness, after 4 hours o.b.B. | |
| 20 | | During the first hour, slowly developing lassitude till about 2 hrs. after the administration. After 3 hours, the lassitude subsides somewhat; after 6½ hrs., o.b.B. |
| 40 | After 30 min., sluggish heavy lids and limbs, in the further course, sleepiness, after 1 hr. some atactic dryness of the mouth. In the absence of fairly strong external stimuli, falls asleep. After 2 hours, slow subsidence of the effect; after about 5 hrs., subjectively o.B. During the activity of the compound, pronounced paleness of the skin. Electrocardiagram (EKG) o.b.B. Blood pressure control and temperature were within normal limits. | In the first hour, slight lassitude becoming slowly greater. Heavy eyelids, pallor of the face, after 90 minutes slight "burning" of the eyes. After 1½ hrs. very strong lassitude; falls asleep in the absence of external stimuli. Slight uncertainty on walking. Lassitude no longer so pronounced; after 2 hrs. only slight, after 6 hrs. During the following hours slowing down of the spontaneous and voluntary reactions. After 12 hrs. fell asleep several times while quietly active (reading). Pallor has subsided. After 14 hours (evening) fell asleep quickly, deep sleep. Woke up the usual time (22 hrs. after the administration o.B.). Electrocardiogram, o.b.B. blood-pressure check test and temperature were within normal limits. |

IV. *Discussion and recapitulation*:

As demonstrated by the foregoing data, Wh7286 is a compound endowed with versatile pharmacological properties. The activity spectrum comprises ataractic, analgetic, tranquilizing, antipyretic, antiphlogistic, anticonvulsive, locally panesthetic, and antiasthmatic effects, in various degrees.

Standing in the forefront of the central effects is a strong ataractive-sedative component. The latter was particularly marked in the hamster, cat, dog, monkey, and—as shown by a few tests conducted with persons—in man. Little sensitive were the mouse, rat, frog and fish. It is possible that as regards the sensitiveness to Wh7286 there exist relationships with the degree of development of the brain, as is well known with the case of hypnotics and anticonvulsive compounds.

The strong effect of analgesic compounds on the rabbit and cat—in this case less than in the rat and mouse—arose above all in the stages of ataraxia and sedation. Distinct qualitative relationships exist between these effects. In evaluating analgesia tests as conducted with animals it should always be borne in mind that one is here concerned with actions on reflex mechanisms, and that these tests do not reveal any unconditioned testimonial power as regards the becoming conscious of "pain." With this reservation, Wh7286 is to be included in the group of the more intensely efficacious analgetics. It is noteworthy that the breath depressing effect which is particularly disturbing felt with some analgetics, is relatively low with Wh7286 (rabbit, dog). The spastic diverse inhibition—often typical for analgesics which can be readily detected in the rat, is totally absent with Wh7286. Conversely, a certain degree of inhibition of the intestinal mobility is observed in the rat, possibly in connection with the distinct musculotrop-spasmolytic action.

In the spontaneous EEG of the cat, Wh7286 can be differentiated from analgesics of the morphine-type and from barbiturates such as hexobarbital, also as regards its influence on "recruiting" potentials, although in the latter respect there is a parallel relationship with chlorpromazine.

The slight reticulo-cortical attenuation present in the EEG and the distinct thalamo-cortical activation do not explain sufficiently the unusually strong centrally depressing properties of the compound. It is probable that part of its main action lies in the inhibition of spinal and bulbar reflex mechanisms. Beyond this, it is conceivable that, under the influence of Wh7286 there occurs a change in the central afferences not detectable by the EEG methods used in the present investigations. In the cortex and cerebrum of cats and rats the serotonine level indicated a certain tendency to drop after Wh7286 had been administered in the heretofore conducted tests; the catecholamine a tendency to rise. However, these changes are not essentially significant. In this respect the compound's effects are like those of chlorpromazine, with which it has several other central properties in common, as, for instance, being partly stronger than chlorpromazine, the antagonistic effect evidenced in opposition to the central excitation by tryptamin, apomorphine and methaniphetine in the rat, which for methamphetamine could also be detected in the EEG of the rabbit. The EEG activation by nicotine in the rabbit is not influenced by Wh7286 and chlorpromazine. However, there are also considerable differences between the two compounds.

In the isolated guinea-pig intestine, Wh7286 exerts a strong nicotine action, in contrast with chlorpromazine.

Again, in contrast with chlorpromazine, Wh7286 lacks to a far-reaching degree the cataleptic effect (rat) and the antematic effect (dog treated with apomorphine). On the contrary, with the dog, vomiting occurred at the higher subcutaneous doses. In the monkey and in the test persons, no vomiting was observed.

For certain purposes as an analgesic the staractic-stuporous action of the compound may become a disturbing factor. For others it is perhaps necessary, above all in conjunction with the relaxation effect: with the cat, dog and monkey it was possible, following an intravenous administration to proceed with surgical operations while consciousness appeared to be maintained to a far-reaching extent. Incisions into the skin were well tolerated. In those instances where the compound alone was insufficient, it became possible to proceed with small additional barbiturate doses.

Although the compound has in non-excessive doses no specific effect on the heart and the coronary transfusion, the intravenous administration is accompanied by a transient tonic action on the circulation. This action occurs in the narcotized and non-narcotized intact animal (dog, cat), in the "spinal" (decapitated) cat and, finally, after extracting the spinal cord, hence is essentially not of a central origin. Obviously, Wh7286 causes the peripheral sympathico tonus (bodily tone) to increase. This is in concordance with the powerful contraction of the sympathetically stimulated nictitating membrane of the cat when the compound is injected intravenously.

The nictitating membrane contraction, as well as the rise in blood pressure, due to Wh7286, occurs also after a preliminary treatment with Ecolid R (a ganglion-blocking compound) as after the expiration of the ganglion cervicale superius, hence is not the consequence of ganglionic stimulation, at least not in the tested dosage range. The traditional vascular-test animals, viz. frog and rabbit ear, afforded weaker findings than was expected; by flooding the lower half of the rabbit trunk the vasoconstriction was more distinct, particularly, however, in the rear extremity of the dog. One surprising finding is vasoconstriction on the hand in the case of intracutaneous or subcutaneous injection in man (self-treatment). It is to be assumed that the pallor of the face in man and monkeys after an oral or intravenous administration is likewise the consequence of any such vascular reaction.

The rise in blood pressure is accompanied by a lowering of the pulse frequency. In the intact vigilant and narcotized animal (dog, cat) the bradycardia (abnormally slow heart action) is prevented by atropine, but with a simultaneous increase of the blood-pressure rise. The reduction of the pulse frequency can be interpreted as a counter-regulatory excitation (stimulation) of the vagus nerve center across the pressor receptors. This view is also supported by the reversal of the blood-pressure action by Wh7286 after the expiration of the carotis sinus, which apparently leads to a predominance of the vagus (depressor).

As shown by the tests conducted by the investigators on their own bodies, the ataractic-sedative effect outlasts considerably the tonic (invigorating) effect on the blood pressure. During the at-rest position the blood pressure drops below the initial values with reascent to the normal value during the gradual vanishing of the ataraxia and sedation.

Also noteworthy is the strong local-anaesthetic effect; the antitussive effect is probably connected therewith in some way, which obviously is also promoted by the sedative action of the compound.

The inhibition of the oedema by Wh7286 is considerable. In the case of the oedema caused by yeast in the rat's paw, the adrenektomised animals were found to be not less sensitive than the normal ones. As regards the evaluation of the oedema tests it should be noted that their specificity is dubious. Positive findings in the test with animals do not justify the assumption that a genuine antiphlogistic effect is now to be implicitly found in man.

The toxicity of the compound corresponds to its strong pharmacological action. From the hitherto conducted tests with subchronic administration to dogs (15 days) and chronic administration to cats (170 days), it can be inferred that the compounds do not cause deep-seated pathological changes in the organs. The tolerance as regards the vascular and muscular systems was sufficiently high in animal tests. After the intracutaneous injection into rabbits, damage to tissues (lesions) were observed; in man, 0.5% solutions, injected intracutaneously, were found to be still tolerable, causing a strong local anaesthesia. In tests conducted by the investigators on their own persons the oral administration was unaccompanied by incompatibility symptoms.

V. *Suggestions as regards indication and dosage:*

In is indicated that Wh7286 will possess clinical utility for the following:

(1) In psychiatry for the treatment of neurosthenic psychoses.

(2) In internal medicine and surgery, as an analgesic in cases of great pain.

(3) As an analgesic in cases of specifically indicated arthritis (indication with a view to the relaxating and antiphalgistic action component).

(4) Internal medicine; as a hypnotic.

(5) In anaesthesiology for premedication and as an independent anaesthetic, as the case may be.

SUGGESTED DOSAGES

Re (1): Oral, single dose; parenteral, single dose—20–40 mg.; up to 80 mg./day 10 to 20 mg. (max.) intramuscular or slowly i.v. within 5 minutes, up to twice a day.

Re (2): Oral, single dose; parenteral, single dose—20–40 mg.; up to 100 mg./day 10–20 mg./(max.) intramuscular, or slowly intravenously within 5 minutes up to 3 times a day.

Re (3): Oral, single dose—10–20 mg. up to 3 times a day.

Re (4): Oral, single dose—20–40 mg. in the evening.

Re (5):

*Premedication.*—Parenteral, single dose 10–25–50 mg. slowly intravenous. Becomes effective after a short latency (about 5 minutes after the injection). Caution: potentially narcotic!

*As an independent anaesthetic.*—Dosage based on experience with premedication.

All the dosage data relate to adults. As to the difference between the sexes nothing is known concerning them up to the present. Caution is to be exercised from the viewpoint of the commercial security factor in view of the strong ataraxia and sedation.

In the case of overdosage, it is advisable, according to the extent state of the investigations, to use Pervitin subsequent to the action.

*Modes of dispensation as a drug:*

(a) Tablets, up to 20 mg., glazed, with indented groove.

(b) Capsules, 1% aqueous solution, capacity 2 to 5 ml.

What is claimed is:

1. A chemical compound selected from the group consisting of compounds represented by the formula:

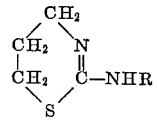

wherein R is a member selected from the group consisting of di-lower alkylphenyl-; tri-lower alkoxyphenyl-; lower alkyl-chlorophenyl-; tri-lower alkylphenyl-; dichlorophyl-; trichlorophenyl; and pentachlorophenyl; and acid addition salts of the same with non-toxic inorganic and organic acids.

2. The chemical compound, 2-(2,6-dimethylphenylamino)-4H-5,6-dihydro-1,3-thiazine.

3. The chemical compound, 2 - (2 - ethyl - 6 - methyl-phenylamino)-4H-5,6-dihydro-1,3-thiazine.

4. The chemical compound, 2 - (2 - chloro - 6 - methyl-phenylamino)-4H-5,6-dihydro-1,3-thiazine.

5. The chemical compound, 2 - (2,6 - dichlorophenyl-amino)-4H-5,6-dihydro-1,3-thiazine.

References Cited by the Examiner

Frankel, "Chemische Berichte," vol. 30, pp. 2509 (1897).

Tisler, "Archiv der Pharmazie," vol. 293, pp. 621–626 (1960).

WALTER A. MODANCE, *Primary Examiner.*

NICHOLAS S. RIZZO, *Examiner.*